United States Patent
Kubota et al.

(10) Patent No.: US 6,590,643 B2
(45) Date of Patent: Jul. 8, 2003

(54) METHOD AND APPARATUS FOR MEASURING VIEWING ANGLE CHARACTERISTIC AND POSITIONAL CHARACTERISTIC OF LUMINANCE

(75) Inventors: Hiroshi Kubota, Kumamoto (JP); Yoshiya Egashira, Oomuta (JP); Tomoaki Furuse, Kumamoto (JP); Satoshi Hirose, Nishigoshi-Machi (JP)

(73) Assignees: Japan Science and Technology Corporation (JP); Kumamoto Technopolis Foundation (JP)

( * ) Notice: Subject to any disclaimer, the term of this patent is extended or adjusted under 35 U.S.C. 154(b) by 0 days.

(21) Appl. No.: 09/818,452

(22) Filed: Mar. 27, 2001

(65) Prior Publication Data

US 2002/0008868 A1 Jan. 24, 2002

(30) Foreign Application Priority Data

Mar. 28, 2000 (JP) ........................................ 2000-089835

(51) Int. Cl.[7] .................................................. G01J 1/00
(52) U.S. Cl. ...................................................... 356/121
(58) Field of Search ................................ 356/121–127, 356/600–613, 138–139, 124.5; 349/117–121, 139–145, 61, 62, 48, 162–165, 130, 113, 106, 42, 65, 71, 5, 95; 359/619, 620, 478, 727, 19, 443; 345/50, 87, 89, 94, 101; 355/71, 67, 69, 70; 362/574, 268, 572, 31; 313/493, 113, 495; 203/DIG. 4

(56) References Cited

U.S. PATENT DOCUMENTS

| | | | | |
|---|---|---|---|---|
| 3,874,796 A | * | 4/1975 | Chovan et al. | 101/DIG. 37 |
| 5,696,550 A | * | 12/1997 | Aoki et al. | 324/770 |
| 5,764,209 A | * | 6/1998 | Hawthorne et al. | 345/87 |

FOREIGN PATENT DOCUMENTS

| | | |
|---|---|---|
| JP | 6-094515 | 4/1994 |
| JP | 06-094515 | * 5/1994 |
| JP | 07-128186 | 5/1995 |
| JP | 08-054349 | 2/1996 |
| JP | 8-220014 | 8/1996 |
| JP | 2000-019012 | 7/1998 |
| JP | 2000-081368 | 9/1998 |
| JP | 10-318880 | 12/1998 |

OTHER PUBLICATIONS

Shigeichi Moriguchi et al., 1957 *Arithmetic Formula II (Series and Fourier Analysis)*, (Iwanami Zensyo No. 229) Iwanami Shoten (1957), p. 265.

S.G Chamberlain et al., 1978 *IEEE Transaction on Electron Devices*, Vo. ED–25, No. 2, pp. 145–154 (1978).

Shigeichi Moriguchi et al., 1957, *Arithmetic Formula II (Series and Fourier Analysis*, (Iwanami Zensyo No. 229) Iwanami Shoten (1957) p. 273.

Kanichi Terasawa, 1983, *A compendium of mathematics for natural scientist*, Iwananami Shoten (1983), p. 108–111.

* cited by examiner

*Primary Examiner*—Tu T. Nguyen
(74) *Attorney, Agent, or Firm*—McGlew and Tuttle, P.C.

(57) ABSTRACT

An apparatus is provided for measuring viewing angle characteristic of luminance and positional characteristic of a radiant object under measurement, by moving a condensing device and an imaging device relative to the object. The apparatus includes a first mechanism for moving the light receiving elements of the condensing device while keeping constant the solid angle subtended by the light receiving element at the radiant area. A second mechanism is provided for moving the imaging device in association with the condensing device, while maintaining thereon the image of the radiant area. A memory is provide. A circuit is provided for calculating viewing angle dependent and position dependent characteristics. A display device is provided for displaying radiance characteristic and distribution characteristic of the object and the result of evaluation of the calculated characteristic of luminance.

8 Claims, 17 Drawing Sheets

* CONVOLUTION

FIG. 3
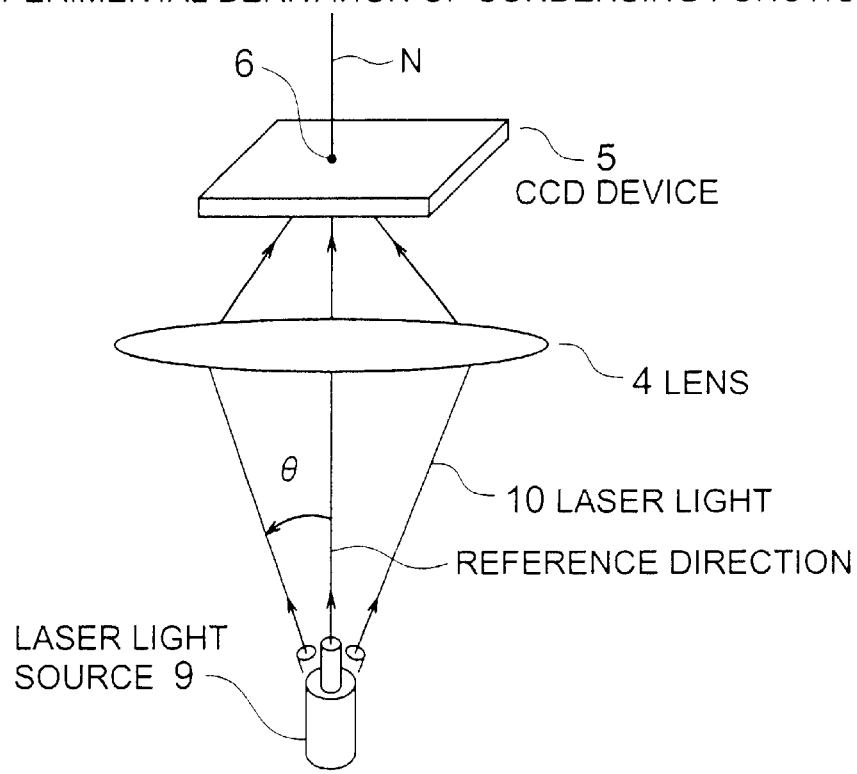
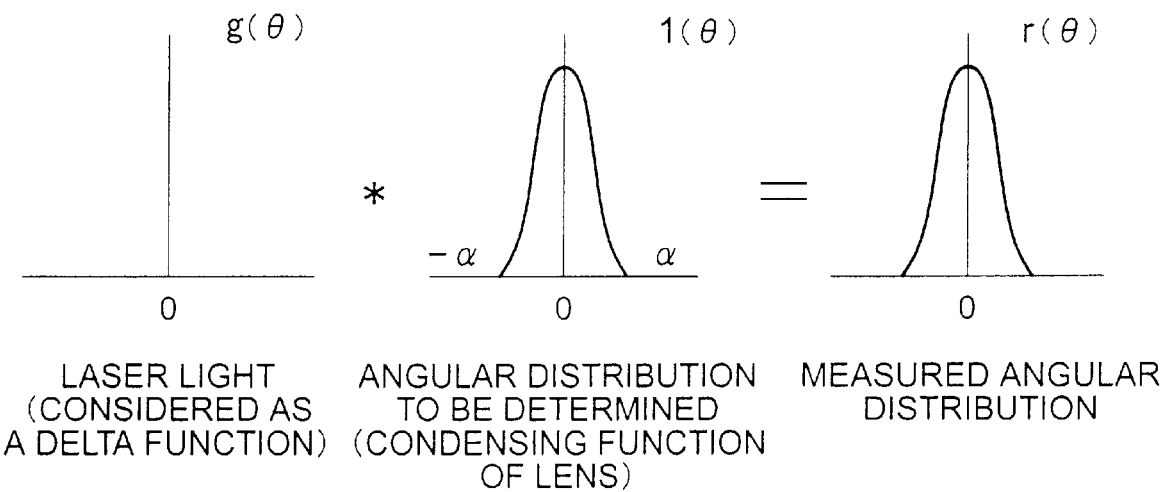

METHOD AND APPARATUS FOR MEASURING VIEWING ANGLE CHARACTERISTIC AND POSITIONAL CHARACTERISTIC OF LUMINANCE

BACKGROUND OF THE INVENTION

1. Field of the Invention

The invention relates to an LCD displays or a semimanufactured goods therefor for use with terminal devices such as notebook type personal computers (PCs) and cellular phones, and more particularly to the methods and apparatuses of measuring viewing angle characteristics and positional characteristics of luminance of such products.

2. Description of the Prior Art

A typical prior art apparatus for measuring angular distribution of luminance (also referred to as luminance distribution measurement apparatus) is disclosed in FIGS. 15, 16, and 17 of Japanese Patent Early Publication of the 6-94515. The apparatus shown in FIG. 15 includes a radiant object in the form of liquid crystal display (LCD) panel 41 having radiant areas (pixels), a light source 42, and a photometer 43 for measuring the intensity of light. The apparatus shown in FIG. 16 includes a mounting table 44, a lens 45, and an array of charge coupled device (CCD) 46. The apparatus shown in FIG. 17 includes a CCD array 47. In what follows like reference numerals refer to like or corresponding parts throughout the specification.

In the prior art apparatus shown in FIG. 15, angular distribution of luminance or viewing angle characteristic of luminance is obtained by measuring the luminance of a pixel 41a, i. e. intensity of radiation from the pixels 41a, of the LCD panel 41 which is illuminated by the light source 42. The measurement is done by rotating the photometer 43 about the pixel 41a in the tangential direction perpendicular to the radiation and measure the intensity of the radiation by the photometer 43.

In the prior art apparatus shown in FIG. 16, the beams of light radiated from the pixel 41a are collimated into parallel beams of light by a lens 45 and supplied to the CCD array 46. The directional characteristic of a radiant pixel 41a is obtained in terms of positional characteristic of the information collected on the CCD array 46.

The apparatuses shown in FIGS. 15 and 16 are designed for the measurement of a characteristic angular distribution of a pixel. Apparatuses such as shown in FIG. 17 are widely used in LCD factories as means for evaluating linear defects and uneven luminance of LCD panels. The apparatus shown in FIG. 17 uses a lens to condense the light that emerges from a pixel 41a onto a CCD array 47.

In the conventional apparatus shown in FIG. 15, it is necessary to make the aperture of the lens sufficiently small in order to attain a high resolution, since the angular resolution of a convex lens 45 in photometer 43 is determined by the aperture of the lens. The apparatus shown in FIG. 16 is handy in that the CCD array 46 need not be moved for the measurement. However, if the pixel density is increased in an attempt to raise the resolution, the average intensity of light per one pixel is disadvantageously decreased. Furthermore, a large aperture lens is needed to obtain a better viewing-angle characteristic, which makes the apparatus costly.

The prior art apparatus of FIG. 17 has a further disadvantage that accurate information of pixels cannot be obtained due to the fact that the information, obtained in the form of image on the CCD array 47, includes angular characteristics of the pixels. Unevenness of luminance of a LCD panel due to angular luminance characteristic of each pixel is best evaluated by comparing the parallel radiation beams emitted from the comparing pixels in the same direction. However, in the apparatus of FIG. 17, the information carried by the light from the central region of the LCD panel onto the CCD array is greatly affected by the information carried by the light from peripheral regions of the LCD panel. (This can be seen from the fact that the vertical angle $\phi 1$ of the beam starting from a peripheral region is greater than the corresponding angle $\phi 0$ from the central region, $\phi 1 > \phi 0$). As a result, if the angular distribution of luminance is the same in the central and the peripheral regions of the LCD panel, the apparatus of FIG. 17 can provide different CCD outputs for the two regions. Hence, the apparatus of FIG. 17 has a drawback that must be overcome if it is usable as an apparatus for evaluating unevenness of pixels.

SUMMARY OF THE INVENTION

It is therefore an object of the invention to provide an improved apparatus attaining a desired resolution in the measurement of angular luminance distribution by increasing the intensity of light falling on each CCD pixel as much as possible, thereby preventing the loss of sensitivity of the CCD device caused by increasing CCD density on the CCD device and preventing loss of the accuracy of the measurement due to condensation effect of the condensing lens.

It is another object of the invention to provide an improved method of measuring the angular distribution of luminance and an apparatus therefor, without loosing the resolution in the measurement.

It is a further object of the invention to provide a method of obtaining accurate data and an apparatus therefor through a correction of the relative position of a condensing lens or a mirror condensing the light from radiant areas when the relative position is changed.

It is a still further object of the invention to provide a measurement apparatus equipped with a light receiving element such as a condensing lens or mirror and a mechanism for moving an imaging device, making expendable conventional large aperture condensing lenses and reducing the number of imaging elements.

It is a still further object of the invention to provide a high-precision apparatus capable, through an appropriate data processing, of obtaining information on the angular dependency of luminance of a radiant area of a panel as viewed from an arbitrary direction by taking account of the radiation not only from particular pixels but from all the pixels of the panel, so that the invention enables inspection of the panel for defects and unevenness of luminance as viewed from an arbitrary direction.

To the accomplishment of the above objects of the invention, there is provided an apparatus for measuring viewing-angle characteristic of luminance and positional characteristic (2-dimensional characteristic) of a radiant object under measurement, by moving a condensing device and an imaging device relative to said object, said condensing device condensing light from radiant area (hereinafter referred to as radiant area) of said radiant object and said imaging device forming thereon a real image of said area, said apparatus comprising:

a first mechanism for moving the light receiving elements of said condensing device while keeping constant the solid angle subtended by said light receiving element at said radiant area;

a second mechanism for moving said imaging device in association with said condensing device, while maintaining thereon said image of said radiant area;

a memory for storing a predetermined condensing function of angle of a beam of light emitted from a laser light source positioned at said radiant area and oriented in the direction at a given angle with respect to the optical axis of said condensing device, said condensing function, the variable of which is said angle of light beam with respect to optical axis, representing the measured intensity of the image formed on said imaging device by said beam of light;

a circuit for calculating the characteristic viewing angle dependent and potion dependent characteristic of luminance (hereinafter referred to as luminance characteristic) of said radiant area based on the data of said measurement and condensing function; and a display device for displaying characteristics of said object and said distribution characteristic of said area evaluated.

In one embodiment of the apparatus of the invention, the condensing device may have light receiving elements in the form of a lens or a flat or concave mirror such that the lens condenses the light reflected by the mirror.

Other embodiments of the apparatus may further include a circuit for making a correction of the measurement, when the solid angle subtended by the light receiving element (lens or mirror) of the condensing device as viewed from the radiant area is changed by the movement of the condensing device, wherein the correction is given by the output of the imaging device measuring the luminance at a solid angle, divided by the output of the imaging device measuring the luminance at a reference solid angle.

A method of measuring viewing angle characteristic and positional characteristic of a radiant object of the invention, comprises steps of moving a condensing device and an imaging device relative to said radiant object so as to construct a real image of said radiant object on said imaging device, said method further comprising steps of:

moving the light receiving elements of said condensing device while keeping constant the solid angle subtended by said light receiving element as viewed from the radiant area;

moving said imaging device in association with said condensing device so as to form thereon the real image of said radiant area to measure the luminance thereof; and calculating the viewing angle dependent and position dependent characteristic of luminance of said radiant area based on the viewing angle dependent luminance data measured by an imaging device and a condensing function of angle of a radiant beam with respect to the optical axis of said imaging device, said condensing function determined by measuring the intensity of the image formed on said imaging device through a condensing device by a beam of light emitted from a laser light source positioned at said radiant area to said imaging device.

The method of the invention further includes a step of making a correction when the solid angle subtended by the light receiving element (lens or mirror) of the condensing device as viewed from the radiant area of a radiant object is altered by the movement of the condensing device, wherein the output of the imaging device representing the directional luminance characteristic of the pixel in that moved direction as viewed from the area towards the center of the light receiving element is dived by the output obtained for the radiation emitted from the object in a specified direction.

BRIEF DESCRIPTION OF THE DRAWINGS

FIG. 3 graphically illustrates derivation of a condensing function used in the invention.

FIG. 4B showing luminance characteristic of a laser as measured by a CCD device; and FIG. 4C showing a condensing function derived from the data shown in FIGS. 4A and 4B.

DESCRIPTION OF THE PREFERRED EMBODIMENTS

Figure 2:
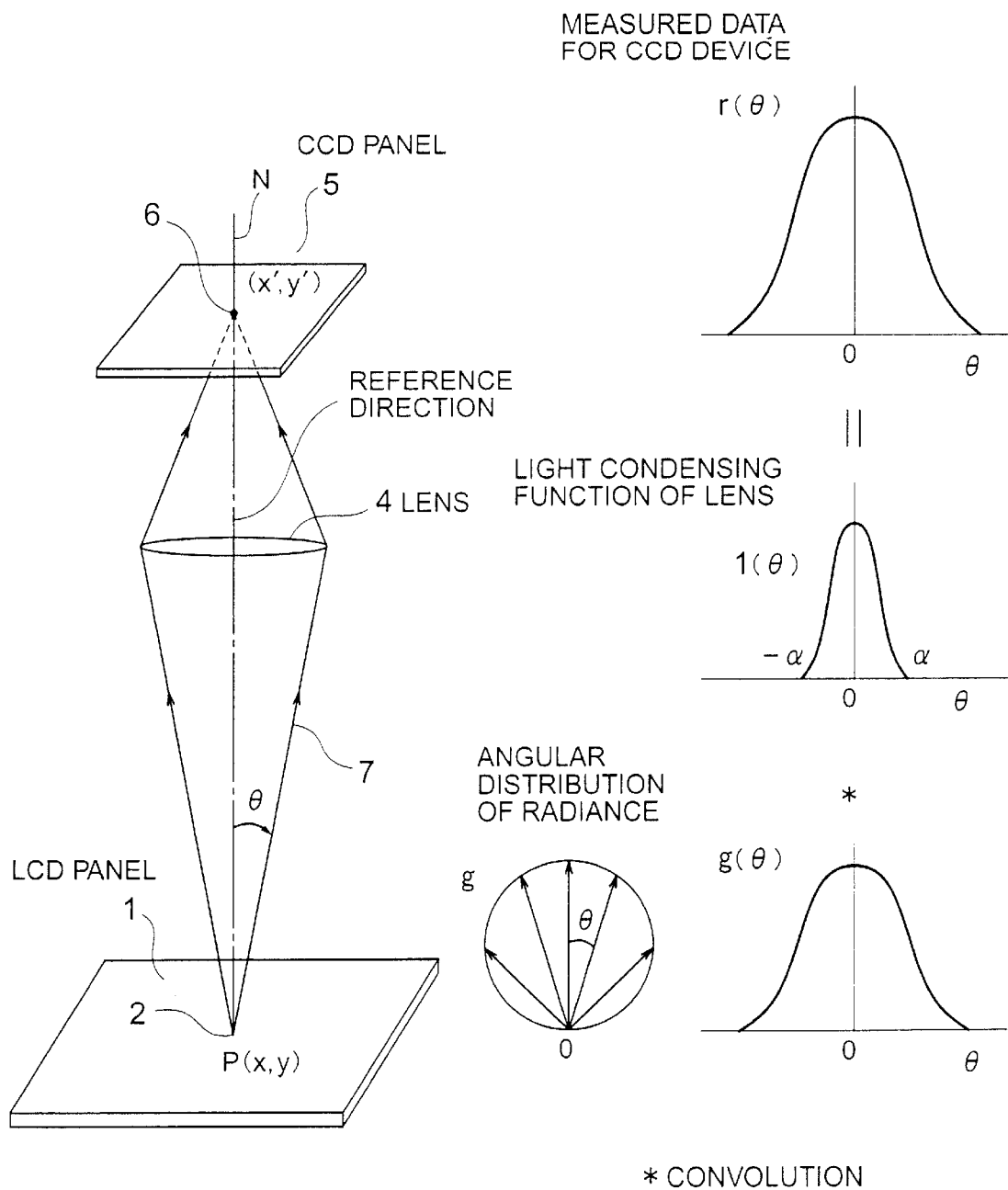
FIG. 2 shows the principle of the invention.

Referring to FIGS. 2 through 5, the principle of the invention will be described prior to detailed description of the embodiments of the invention. For simplicity, attention will be restricted to one dimensional case. Referring now to FIG. 2, the direction that makes an angle θ with the normal line N to the LCD panel 1 will be referred to as θ-direction. When a real image of a radiant area 2 (pixels) having an angle-dependent radiation intensity g(θ), is formed on a CCD device 5 by the lens 4 oriented in θ direction and having a condensing function |(θ), the output power r(θ) of the CCD device 5 is given by Eq. (1) below.

$$r(\theta) = g(\theta) * |(\theta) \qquad (1)$$

where the symbol * stands for convolution integration, or simply convolution. Definition and determination of the condensing function |(θ) through experiment will be described in detail later.

For further details of the convolution integration g(θ)*|(θ)., refer to "Mathematical Formula II (Series and Fourier Analysis) (Iwanami Zensyo No. 229)" by Shigeichi Moriguchi et al., p265 (1$^{st}$ ed), published from Iwanami Shoten (195). Also refer to S. G. Chamberlain et al., IEEE Transaction, ED-25, pp. 145–154(1978) for more information on the convolution integration applied to the light that has passed a lens having a given width function (which corresponds to the condensing function).

Here, "condensing function" is defined as follows. When a real image of a radiant area is formed by an optical system (e.g. lenses) at its imaging position, component of radiant energy in a direction of θ with respect to a referential direction (which is the direction radiation under measurement) is defined to be the relative intensity of light condensed onto the image. For example, assuming that all the beams of light within an angular interval (δ) are condensed to form an image, the intensity function |(θ) is given by $$1(\theta) = 1 (-\delta \le \theta \le \delta) \quad (2)$$
$$= 0 (\theta > \delta, \theta < -\delta)$$

It is noted that if some of the light impinging on the peripheral region of the lens is lost due to for example reflection, equation |(θ) may be approximated by the following formula.

$$|(\theta) = \exp[-\theta^2/\sigma^2] \quad (-\delta \le \theta \le \delta) \quad (3)$$
$$= 0 \quad (\theta > \delta, \theta < -\delta)$$

where σ is a constant.

By taking Fourier transforms of both sides of Eq. (1), the following relationship is obtained.

$$F[r(\theta)]=F[g(\theta)]\times F[|(\theta)] \quad (4)$$

where F[r(θ)] stands for the Fourier transform of r(θ). In the above calculation, use is made of an important theorem (called convolution theorem) that the Fourier transform of a convolution or convolution integration is given by the product of the Fourier transforms of each integrand (see page 265, Moriguchi et al., op. cit.) Hence, $$F[g(\theta)]=F[r(\theta)]/F[|(\theta)] \quad (5)$$

Since g(θ) is the inverse Fourier transform of F[g(θ)], it can be obtained from F[g(θ)] by taking the inverse Fourier transform of Eq. (5), which yields $$g(\theta)=F^{(-1)}[F[r(\theta)]/F[|(\theta)]] \quad (6)$$

where $F^{-1}[-]$ represents the inverse Fourier transform of the quantity "-" in the bracket [ ]. Using Eq. (6), the luminance distribution function g(θ) of the lens with the condensing effect of the lens remove is obtained from the measured value r(θ) and the condensing function |(θ)..

Derivation of the condensing function |(θ) will now be described below. FIG. 3 shows that the real image of a laser light source 9 formed by a lens 4 on a planar array of photodiodes 6. By inclining the laser light source 9, the direction of the laser beam 10 can be changed through an angle θ with respect to the optical axis of the lens 4. Since the condensing function |(θ) of the lens 4 is given by the transmittance of lens, i. e. the intensity of light exiting the lens divided by the intensity of light entering the lens at angle of incidence θ, angular characteristic of the laser can be obtained by measuring the output power of the CCD device.

Mathematically, the luminance distribution function g(θ) can be approximated by Dirac's delta function. Since the Fourier transform of delta function is a constant (see page 273, Moriguchi et al., op. cit.), one obtains the following result.

$$F[r(\theta)]=\text{Constant}\times F[|(\theta)]. \quad (7)$$

Hence, measured luminance function r(θ) is obtained from the condensing function |(θ) of Eq. (8).

$$r(\theta)=\text{Constant}\times|(\theta). \quad (8)$$

Further, the condensing function |(θ) is determined by measuring the absolute value of the transmittance of the lens 4 for the light impinging on the lens at right angle of incidence.

Figure 4A:
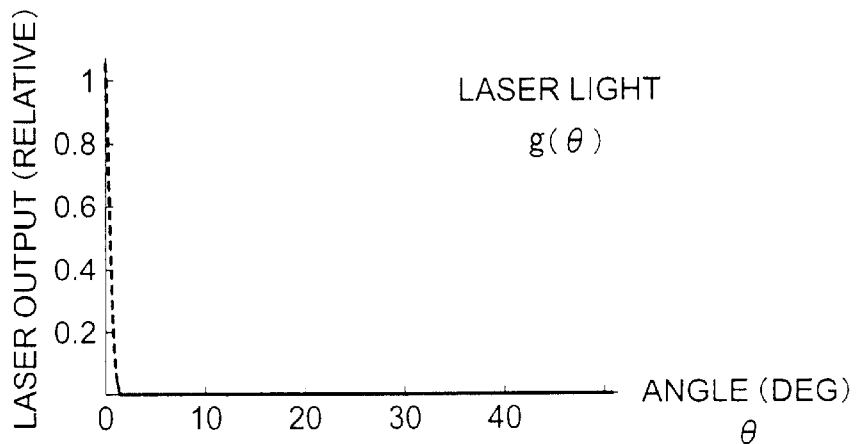
FIGS. 4A, 4B, and 4C shows derivation of an exemplary condensing functions, with FIG. 4A showing the output characteristic of a laser.
Figure 4B:
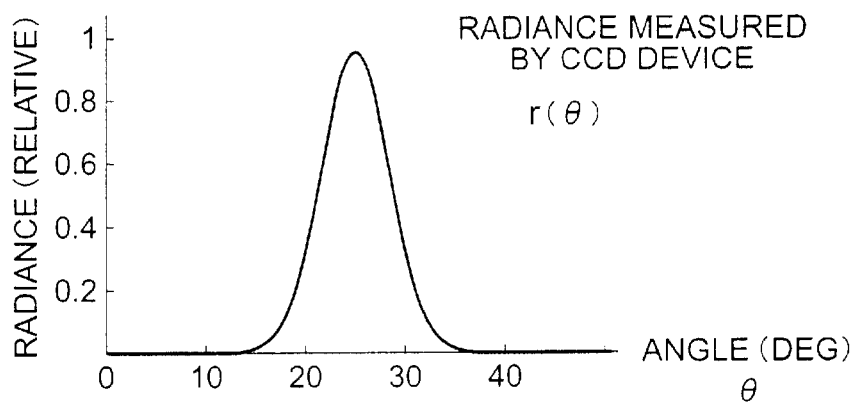
Figure 4C:
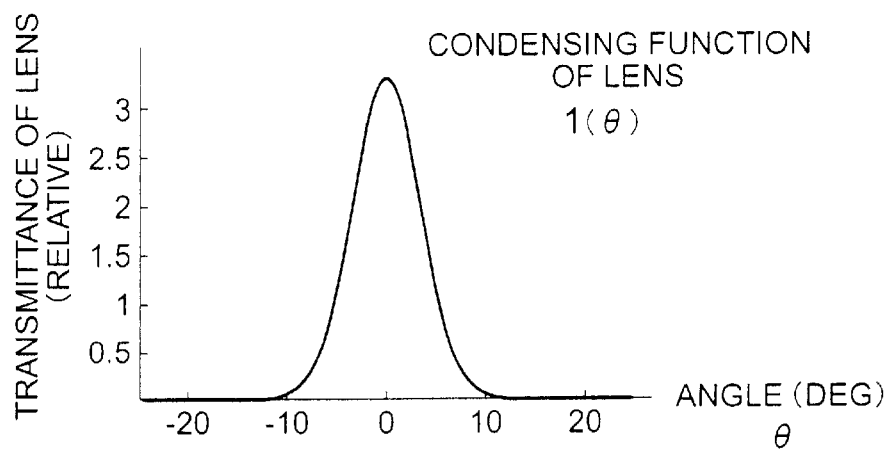

FIGS. 4A–4C together show how the condensing function of a lens is obtained. For a beam of light emerging from the laser 9 of FIG. 3 in a very narrow solid angle subtending (from the laser 9) the lens 4 and entering the CCD device through the lens 4, the output r(θ) of the CCD device has an angular distribution as shown in FIG. 4B.

It is seen that the condensing function |(θ) of the lens has the same angular distribution as the measured output of the CCD device shown in FIG. 4B.

Figure 5A:
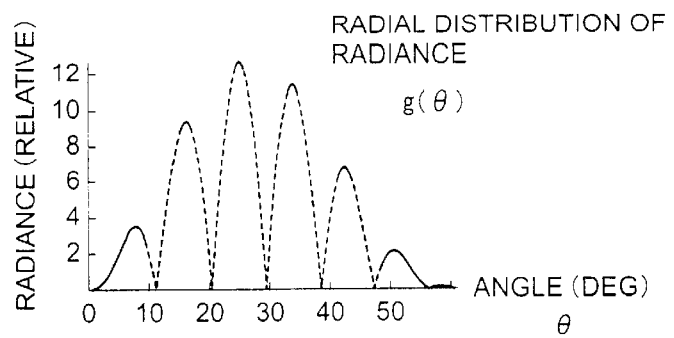
FIGS. 5A, 5B, 5C, and 5D together illustrate the process of calculating a condensing function based on the principle of the invention, with FIGS. 5A specifically showing luminance distribution of a light emitting area (pixels), FIG. 5B showing a condensing function of a condensing device, FIG. 5C showing measured luminance distribution as measured by a CCD device, and FIG. 5D showing a luminance distribution obtained through calculations.
Figure 5B:
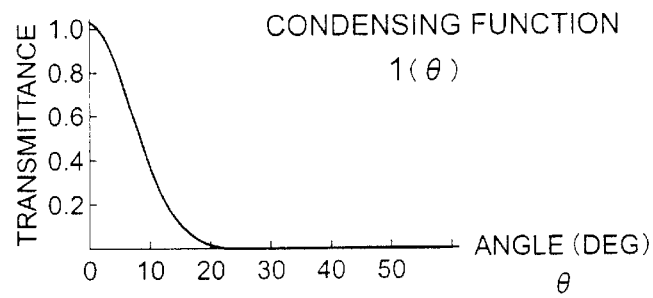
Figure 5C:
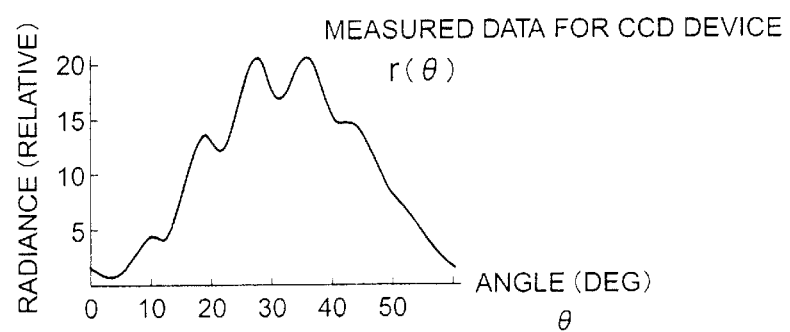
Figure 5D:
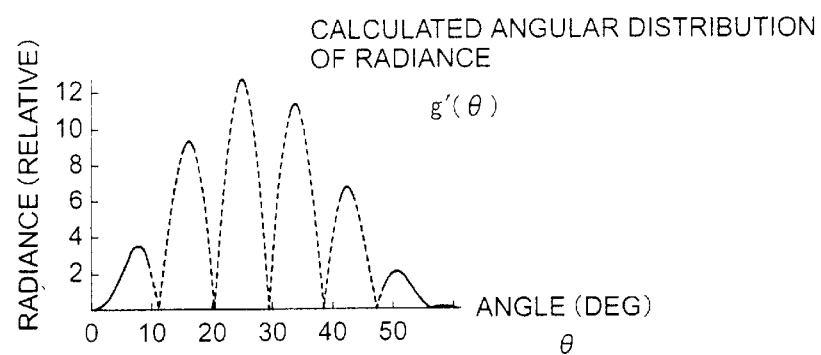

FIGS. 5A–5D together show steps of calculating the luminance distribution of a given radiant object using a known condensing function |(θ) of a lens. As an example, when the luminance distribution g(θ) depends on of the θ as shown in FIG. 5A, and the condensing function |(θ) of the lens depends on θ as shown in FIG. 5B, the output of the CCD device will have a luminance distribution as shown in FIG. 5C. This is due to the fact that the lens collects light from different areas having different angles of incidence. However, if the condensing function |(θ) of the lens is known as shown in FIG. 5B, the distribution of luminance g'(θ) as shown in FIG. 5D can be obtained from Eq. (6). It is noted that this distribution is the same as the luminance distribution shown in FIG. 5A. Therefore, it is seen that the luminance distribution can be accurately obtained without being influenced by the condensing effects of the lens, through Eq. (6).

Figure 6:
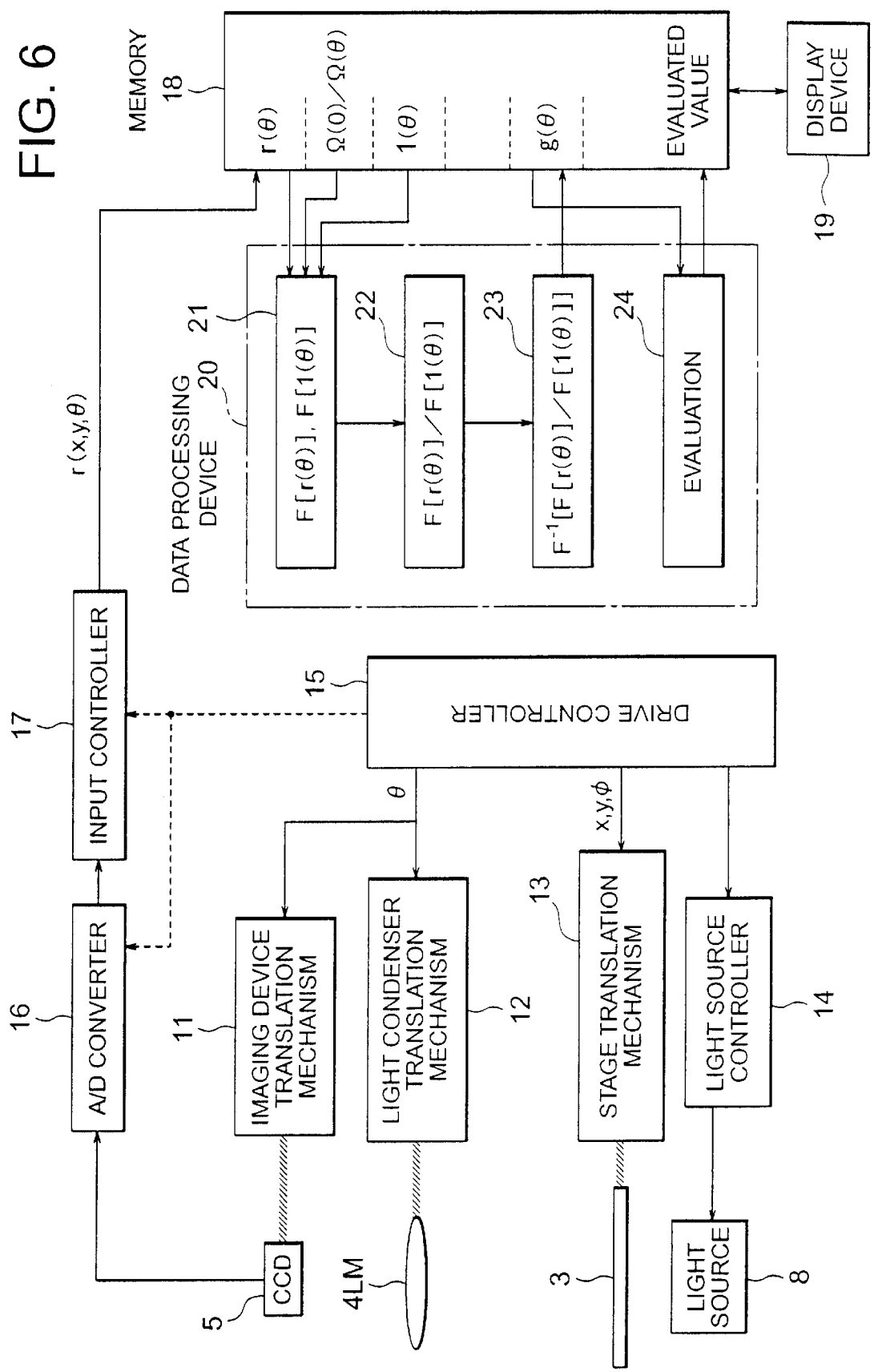
FIG. 6 is a schematic view of a measurement apparatus according to the invention.

FIG. 6 illustrates schematically the measurement apparatus of the invention. The apparatus includes: a condensing device 4LM consisting of such optical elements as lens or mirror; an imaging device translation mechanism 11 for translating the CCD device 5; condensing device translation mechanism 12 for translating the condensing device 4LM; a stage translation mechanism 13; a light source controller 14; a drive controller 15; an A/D converter 16; an input controller 17; a memory 18; a display device 19; and a data processing device 20.

The data processing device 20 has a circuit for performing Fourier transform of F[r(θ)] and F[|(θ)]; a division circuit 22 for performing division F[r(θ)]/F[|(θ)]; an inverse Fourier transform circuit 23 for performing inverse Fourier transform of F[r(θ)]/F[|(θ)]; and an evaluation circuit 24 for evaluating the values of the luminance distribution function g(θ) obtained. The memory 18 stores the condensing function |(θ) and its incident flux correction Ω(0)/Ω(θ), along with measured luminance data r(x, y, θ) obtained by the imaging device, calculated values of the luminance distribution g(θ), and the result of the evaluation thereof. The display device 19 displays data stored in the memory 18 to facilitate relevant inspections and examinations of the characteristics of the LCD panel 1 during the manufacture thereof. A CPU may be used to facilitate data processing.

Figure 7:
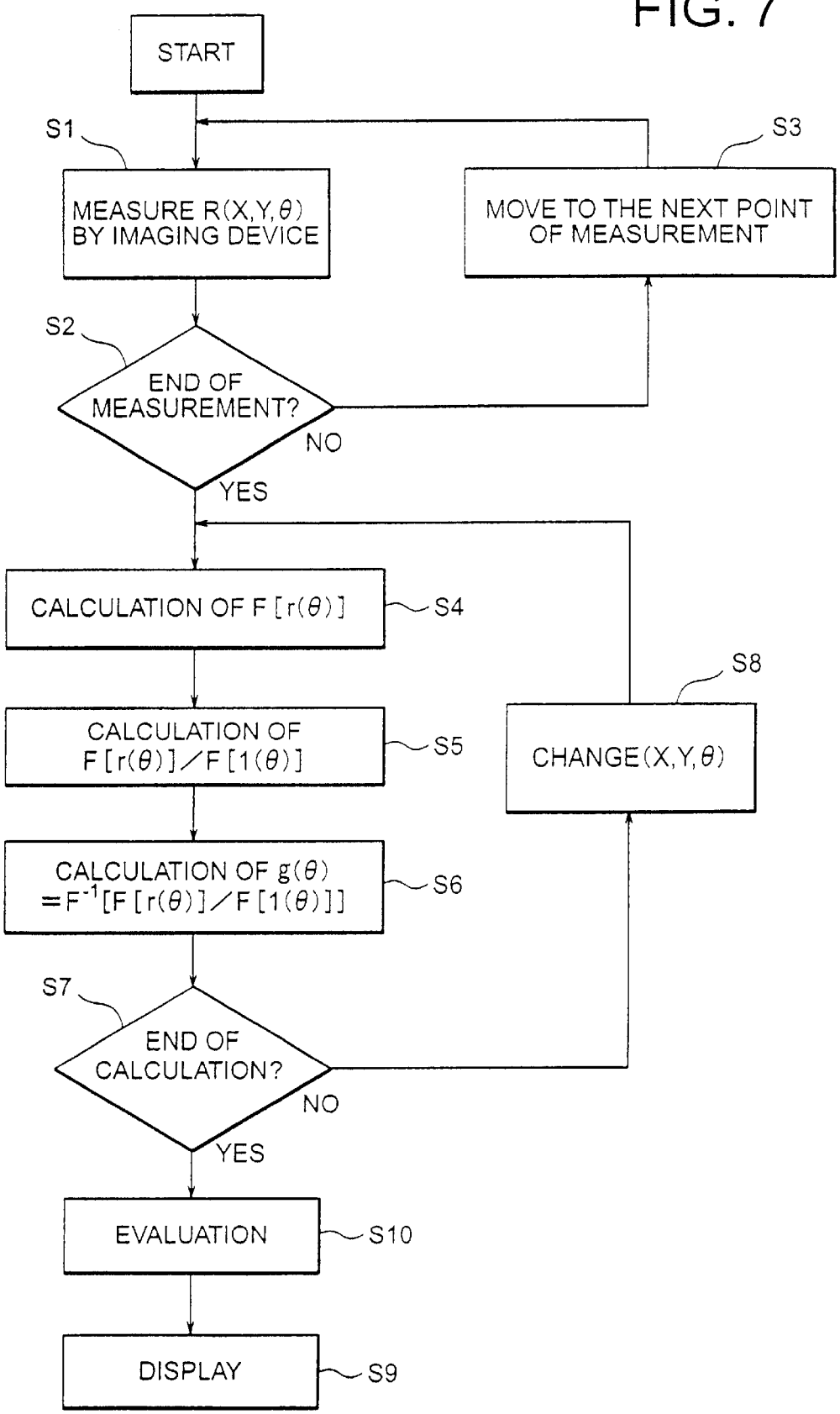
FIG. 7 is a flowchart illustrating the concept of the methods of measurement and evaluation according to the invention.

FIG. 7 is a flowchart showing a procedure of the measurements according to the invention. Referring now to FIGS. 6 and 7, operations of the apparatus will be described below. The drive controller 15 provides the stage translation mechanism 13 with x-, y-, and φ-instructions indicating (x, y) coordinate of the radiant area (e. g. LCD pixel(s) on the stage 3 and rotational angle φ with respect to the coordinate (x, y), respectively. The stage translation mechanism 13 moves, rotates and positions the stage 3 at the position of the object. Following the positioning, the drive controller 15 instructs the condensing device translation mechanism 12 of the viewing angle θ at which measurement of luminance is made. The condensing device translation mechanism 12 then moves the condensing device 4LM to the position where the viewing angle is θ relative to the normal to the radiant area of the LCD panel. Similarly, upon receipt of the θ instruction, the imaging device translation mechanism 11 moves the CCD device 5 to a position where the image radiant area is formed.

The CCD device 5 receives the light propagating in the direction of θ and condensed by the condensing device, and transform it into electric signals, which is converted into digital signals r(x, y, θ) by the A/D converter 16. The input control device 17 sends the digital data r(x, y, θ) to the memory 18. (Step S1).

Next, the condensing device 4LM and the CCD device 5 are moved to the next angular position, while the stage 3 is moved to a new x- and y-coordinate position and θ-direction for the measurement of the next radiant area by the 5. (Step S3).

When the luminance measurements are done for all the radiant areas (Step S2), calculations of the luminance distribution is started.

Using the data r(θ) obtained in the measurement and the condensing function |(θ) of the condensing device, the Fourier transforms of the measured r(θ) and the condensing function |(θ) (Step S4) are calculated by the Fourier transform circuit 21, from which F[r(θ)]/F[|(θ)] is calculated in the division circuit 22 (Step S5), from which the inverse Fourier transform $F^{-1}[F[r(θ)]/F[|(θ)]]$ is calculated by the Inverse Fourier transform circuit 23 to obtain the luminance distribution function g(θ) (Step S6).

This procedure is repeated for each data points (x, y, θ). (Steps S7 and S8).

In a case where the intensity of light entering the condensing device varies with the position of the condensing device 4LM, measured value r(θ) is multiplied by the incident flux correction factor Ω(0)/Ω(θ) before the data is Fourier transformed. This factor will be further described in detail later.

The luminance distribution function g(θ) of the radiant object thus obtained by the calculations based on the actual imaging information on the imaging device is displayed on the display device 19 as representing the viewing angle characteristic of the object. (Steps S9).

The calculated function g(θ) is representing the viewing angle luminance characteristic of a radiant area of an object in the direction of the viewing angle is compared with a corresponding reference threshold value, to thereby determine if unevenness exists in the luminance at the position of that object. (Steps S10).

EMBODIMENT 1

A first embodiment of the inventive apparatus will now be described.

Figure 1A:
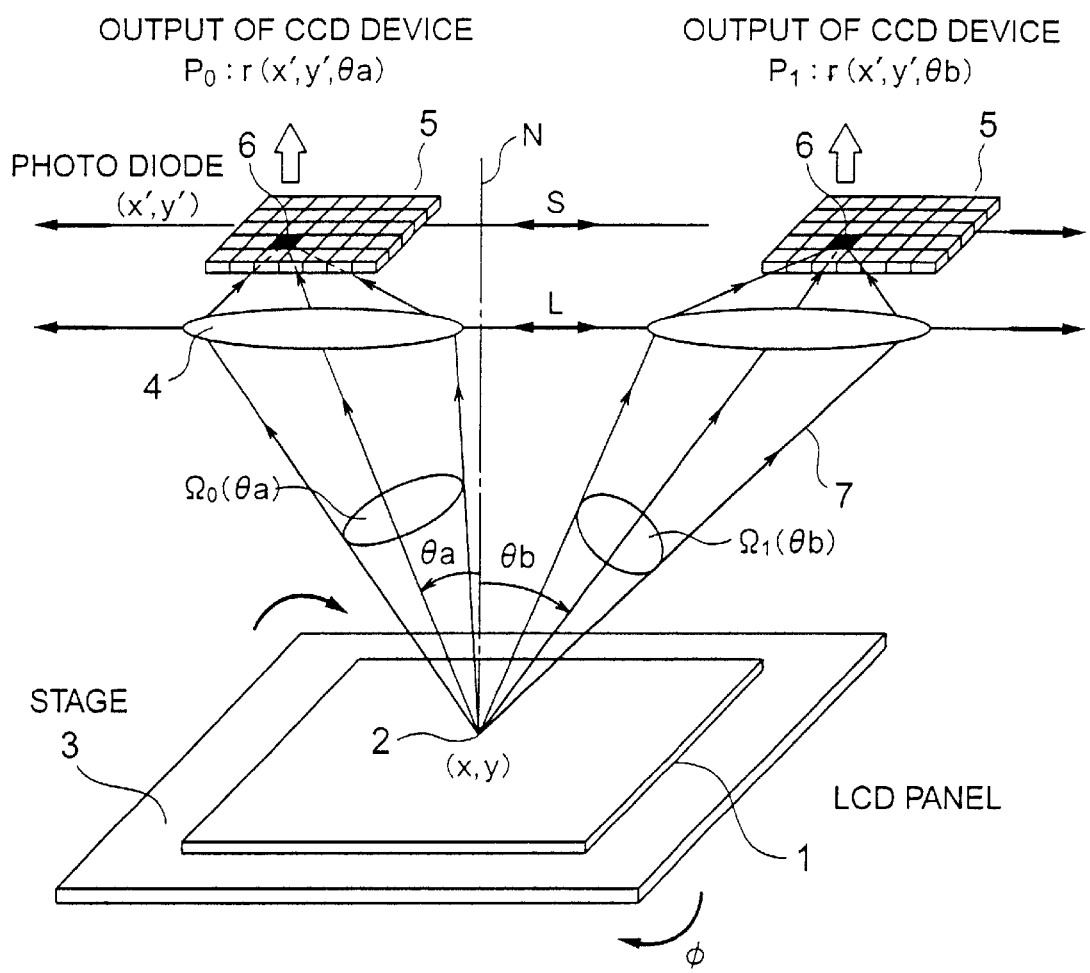
FIG. 1A is a perspective view showing an arrangement of the invention.
Figure 1B:
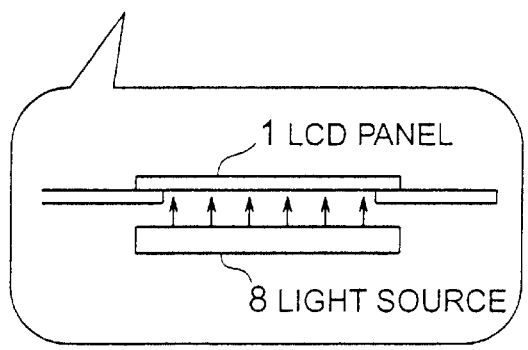
FIGS. 1B show operation of an LCD panel.

Referring to FIG. 1A, there is shown a bird-eye view of a first luminance distribution measurement apparatus of the invention. FIG. 1B shows a cross sectional view of the stage section of the apparatus shown in FIG. 1A. As shown in FIG. 1A, the apparatus includes an LCD panel 1 which is the radiant object under measurement, a radiant area of the 2 (which is an LCD pixel in this example), radiating beams of light 7 from the radiant area (LCD pixel) 2, a stage 3 for translating the LCD panel, a lens 4 for receiving and condensing the light, a CCD serving as an imaging device, and photodiodes 6 of the CCD device. Shown in FIG. 1B by a reference numeral 8 is a light source of the LCD panel of the 1.

In the EMBODIMENT 1 shown in FIG. 1A, the CCD device 5 is positioned such that the beams of light emerging from the pixel 2 at the coordinate (x, y) of the LCD panel 1 forms its real image at the coordinate (x', y') on the plane of the photodiodes 6. In the EMBODIMENT 1, the lens 4 is moved by the condensing device translation mechanism 12 in a direction L parallel to the plane of the stage 3, to the angular position which corresponds to the direction of θ at which luminance measurement is performed. At the same time the CCD device 5 is also moved in a direction S in parallel to the stage to a position where the image of the pixel 2 may be formed on an area of the plane of photodiodes 6 through the lens 4. Because of this arrangement, accurate luminance information can be obtained by reading the information gathered by the regional photodiodes 6, should a minor misalignment occur in the optical geometry.

It should be understood, however, that a necessary condition for the invention is to move the lens (condensing device) in harmony with the CCD device so that the CCD device 5 maintains the image of the pixel formed thereon and that the CCD device 5 and the lens 4 need not be moved in parallel with each other, as will be apparent from other embodiments described below.

The luminance distribution function g(θ) can be obtained from Eq. (6). When the solid angle subtended by the lens as viewed from the pixel under measurement is small for the movement as described above, the value of the condensing function |(θ) may be safely approximated by the value of the function at a given reference direction, |(θ) say.

When the measurable domain of the angle θ for the measurement apparatus(lens 4) is limited within a small finite range −β<θ<+β for example because of the geometry of the measurement apparatus used, the values of r(θ) cannot be actually measured outside the region. However, the luminance can be obtained accurately through Fourier transformation for the region −β+α<θ<+β−α irrespective of the values of r(θ) in the range, where α is the angle corresponding to the radius of the lens as shown in FIGS. 2 and 3.

It is noted that in the embodiment shown in FIG. 1A, the CCD device 5 is moved so as to maintain the image formed on the CCD panel during the movement of the lens 4. Thus, the information on the pixels at a given point (x, y) of the LCD panel, collected at the point (x', y') of the CCD device, also contains the information on the pixels at different points of the LCD panel. Accordingly, all the information regarding the luminance distribution of any LCD pixel can be obtained from the limited measurements made by the lens 4 within the limited domain.

The measurement apparatus of the invention has a further advantage that the translation mechanisms for the CCD device 5 and for the lens 4 require only one degree of freedom of motion, provided that the stage 3 can be rotated by the stage translation mechanism 13 through an arbitrary angle φ.

EMBODIMENT 2

Figure 8:
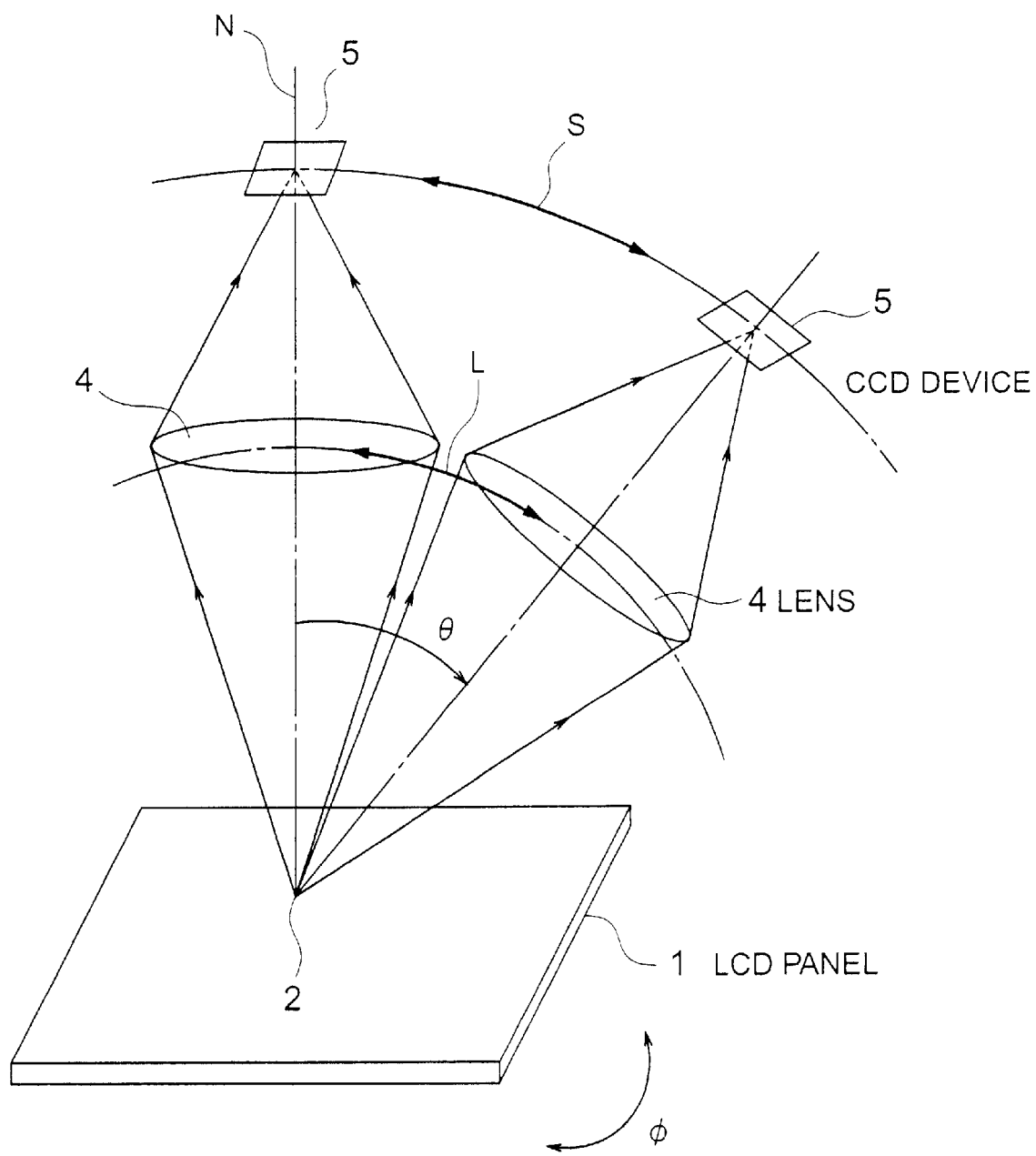
FIG. 8 shows another embodiment of the invention.

FIG. 8 is a bird-eye view of a second apparatus for measuring the luminance distribution of an LCD panel according to the invention. In the arrangement shown in FIG. 8, the lens 4 serving as the condensing element is rotated by the condensing device translation mechanism (not shown) about the radiant area 2 in the direction L, keeping constant the solid angle subtended by the lens 4 as viewed from the radiant area 2. At the same time the CCD device is also rotated by the imaging device translation mechanism about the radiant area 2 in the direction S as shown, keeping thereon the image of the radiant area 2 formed. The luminance distribution function $g(\theta)$ of the LCD panel 1 can be obtained from Eq. (6) as described in connection with EMBODIMENT 1. In this case the condensing function $|(\theta)$ is constant, since the solid angle subtended by of the lens 4 as viewed from the radiant area 2 is constant at any angle $\theta$, so that the accuracy of the data obtained in the measurement is high.

If, in addition, the stage 3 can be rotated by the stage translation mechanism 13 (through an angle $\phi$), the translation mechanisms for the CCD device 5 and the lens 4 may advantageously have only one degree of freedom of motion in a specified direction.

EMBODIMENT 3

It is noted that in the embodiment 1 the angle subtending the lens 4 from the radiant area 2 varies with the position of the lens 4. In this instance also, highly accurate evaluation of the luminance may be obtained by making a correction of the luminance as described below.

Assuming in FIG. 1A that $\theta$ is the angle subtended the lens 4 from an radiant area 2 of the LCD panel with respect to the normal line N at the radiant area; P0 is the output power of the CCD device and $\Omega 0$ is the solid angle (steradian) subtended the lens when the lens of the 4 is located at the angle $\theta a$; P1 is the output CCD device; and $\Omega 1$ is the solid angle subtended the lens 4 when the lens 4 is positioned at angle $\theta b$, then the output power P1' CCD device after the correction of P1 with respect to the lens position $\theta a$ is given by the following formula.

$$P1'=P1\times(\Omega 0/\Omega 1) \qquad (9)$$

A decrease in flux of incident light to the lens 4 due to a decrease in solid angle of the lens 4, a correction is made to improve the accuracy of the measurement, using Eq. (9). For details of solid angle, see for example, a book by Kanichi Terasawa, pp. 108–111, entitled as "A compendium of Mathematics for Natural Scientists", published from Iwanami Shoten (1983).

This correction is not limited to the embodiment shown in FIG. 1A, but is applicable to all cases when more than one radiant element (e. g. pixels) are included in the converging device 4LM and/or when the angle subtending the lens 4 changes during the measurement.

EMBODIMENT 4

Figure 9:
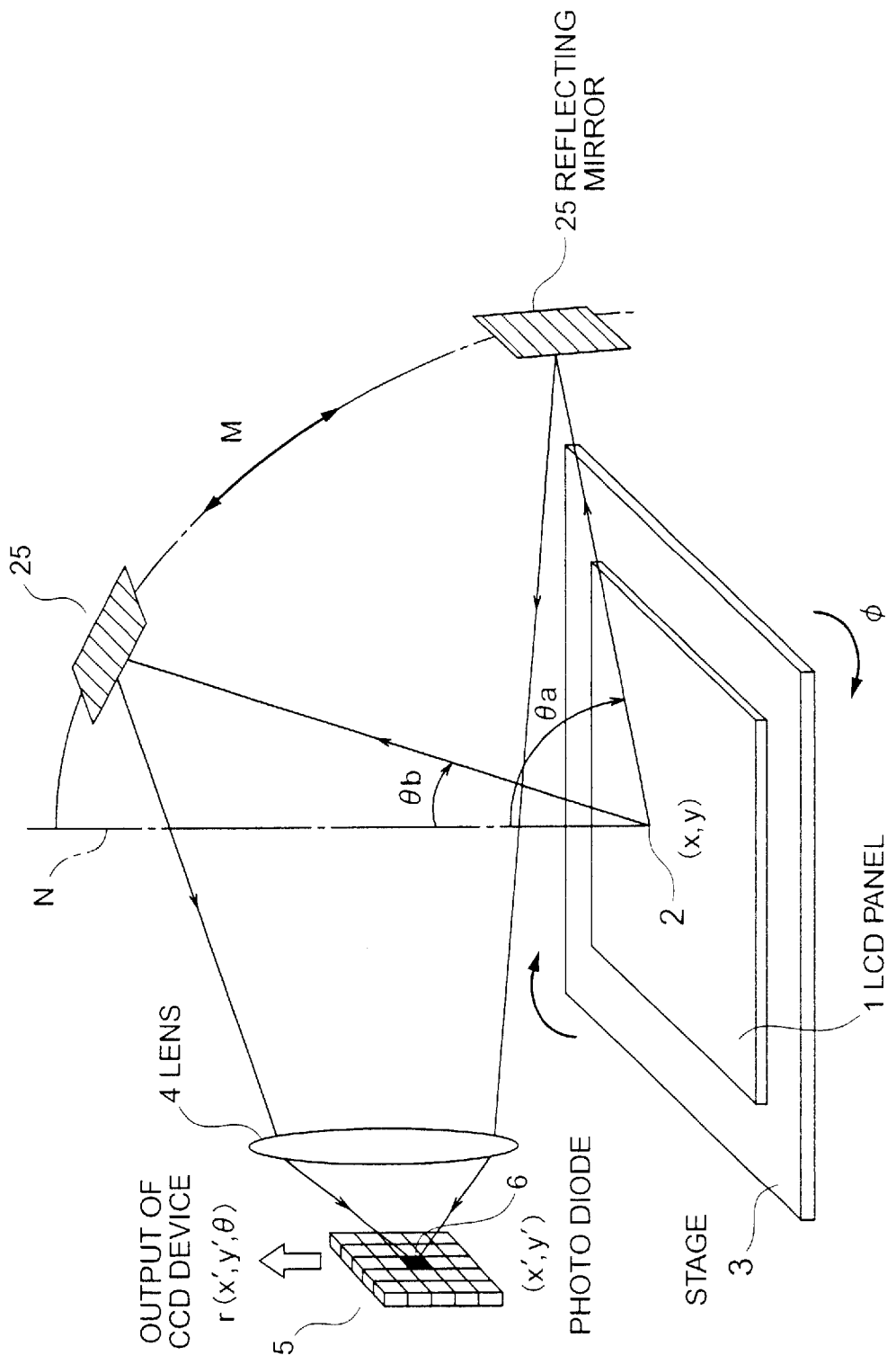
FIG. 9 shows a condensing device of the invention having a mirror and lenses.

FIG. 9 is a bird-eye view of a fourth apparatus for measuring the luminance distribution of a radiant object. Shown in FIG. 9 by a reference numeral 25 is a planar or concave mirror. Thus, the condensing device of FIG. 9 comprises a lens 4 along with the planar/concave mirror 25. In the example shown herein the mirror 25 works as the optical condensing element. The CCD device 5 is arranged in position so that the image of the radiant area 2 located at the pixel coordinate (x, y) on the LCD panel 1 is formed at the position (x'. y') on the photodiodes by the mirror 25 and the lens 4. This example has an arrangement where lens 4 and the CCD device 5 need not be moved if the mirror 25 is moved in the direction M by the condensing device translation mechanism 12 from an angular position of $\theta a$, measured with respect to the normal line N, to the angular position of $\theta b$.

The luminance distribution function $g(\theta)$ of the LCD panel can be obtained from Eq. (6) as in the first embodiment. It is noted that in the example shown herein the condensing function $|(\theta)$ represents the angle dependent characteristic ($\theta$-characteristic) of the radiant area at (x, y), defined in cases where the product of the reflectivity of the mirror 25 and the transmissivity lens 4 changes with the angular deviation $\theta$ made by a line connecting the center of the mirror 25 and the point (x, y). However, the reflectivity mirror and the transmissivity of the lens can be safely approximated by 1, so that the functions $|(\theta)$ can be replaced by a rectangular function as defined by Eq. (2). The measurement is performed using a laser, as shown in FIG. 3.

EMBODIMENT 5

Figure 10:
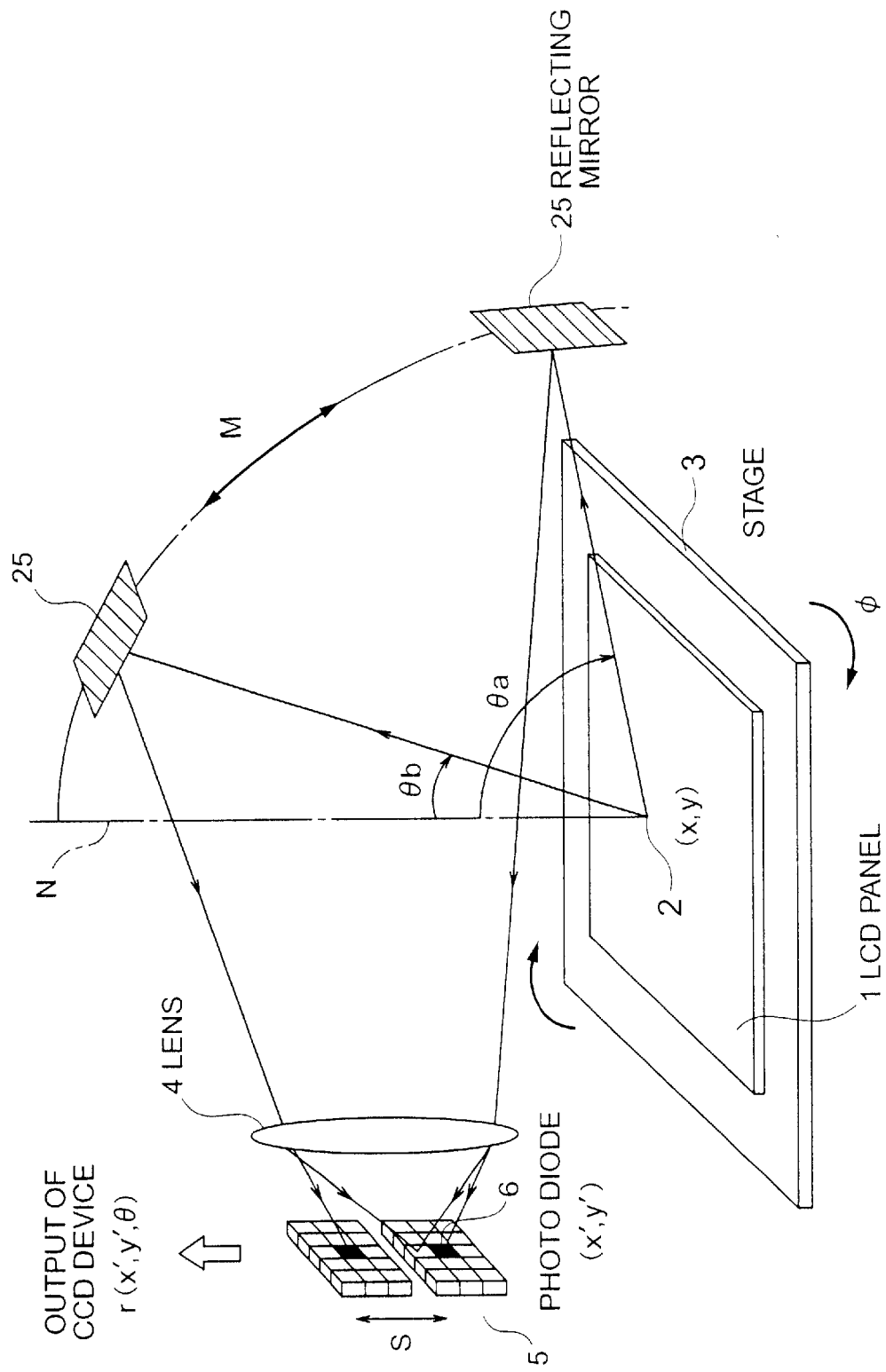
FIG. 10 shows another condensing device having a mirror and lenses.

FIG. 10 is a bird-eye view of a fifth apparatus for measuring the luminance distribution of a radiant object according to the invention. In contrast to the CCD device of the fourth apparatus which is not movable, the CCD device 5 of the fifth embodiment can be linearly rotated (in the direction S) by the imaging device translation mechanism in association with the rotation of the mirror 25 (in the direction M) through an angle $\theta a$ and $\theta b$ with respect to the normal line N. Thus, the fifth embodiment advantageously has a higher degree of freedom in the design of optical elements such as lens 4.

EMBODIMENT 6

Figure 11:
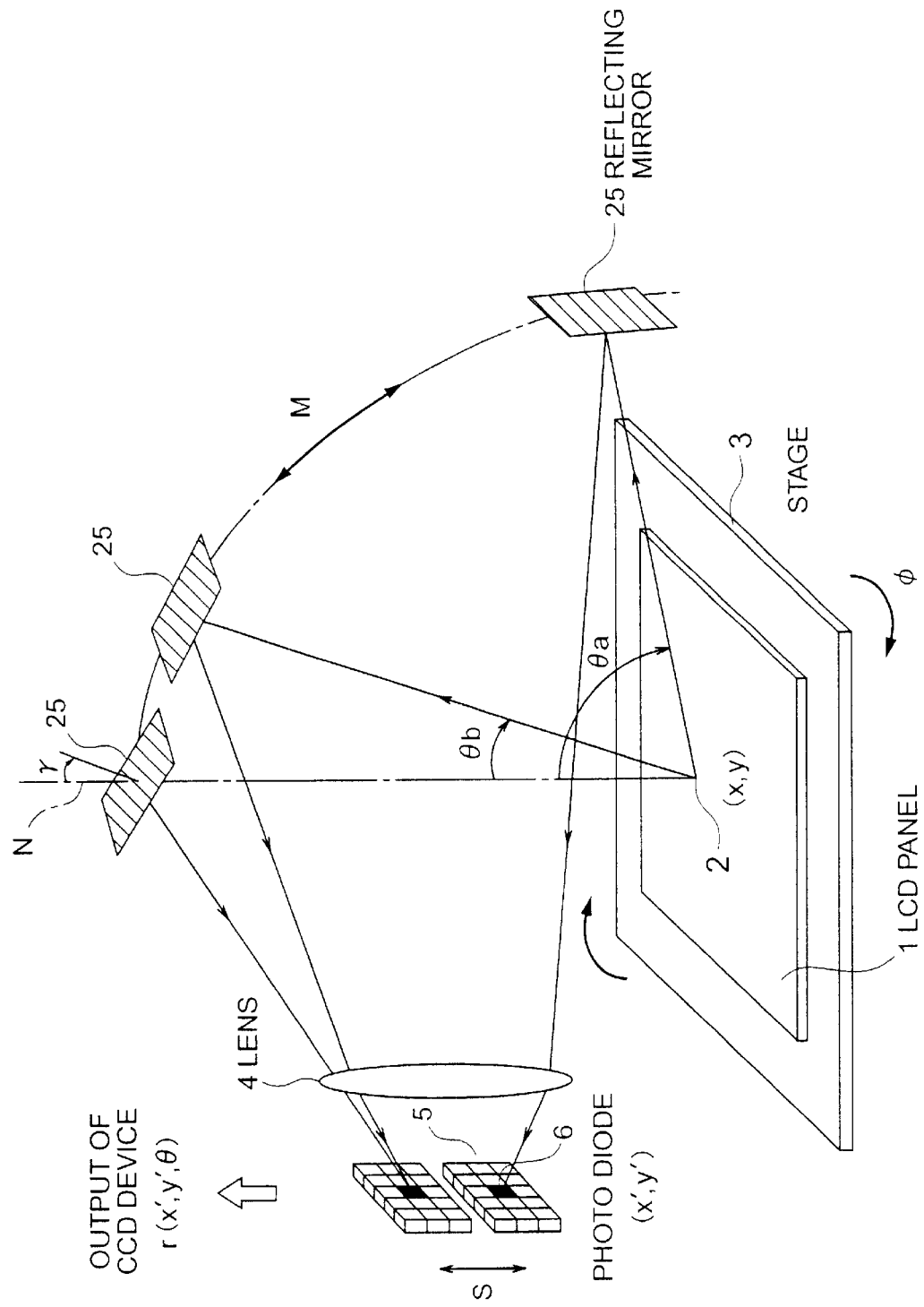
FIG. 11 shows still another condensing device having a lens and a mirror.

FIG. 11 is a bird-eye view of a sixth apparatus for measuring luminance of a radiant object according to the invention. It can be seen in the fifth embodiment that if the flat or concave mirror 25 is located at and near the highest position directly above the LCD panel, where the angle $\theta$ is small, it is difficult to form the image of the radiant area (pixels) 2 by the lens 4 within a given area of photodiodes 6. Therefore, in the sixth embodiment, when the flat or concave mirror 25 is in such small angle region, this difficulty is overcome by slightly rotating the mirror 25 through an angle $\gamma$ with respect to the normal line N so that the reflected light is directed to the photodiodes 6 to form a real image of the radiant area (pixel) 2 within a desired section of the photodiodes 6. Similarly, in the fourth embodiment shown in FIG. 9, accurate measurement of luminance distribution can be carried out in such a small $\theta$ region by inclining the flat or concave mirror.

EMBODIMENT 7

Figure 12:
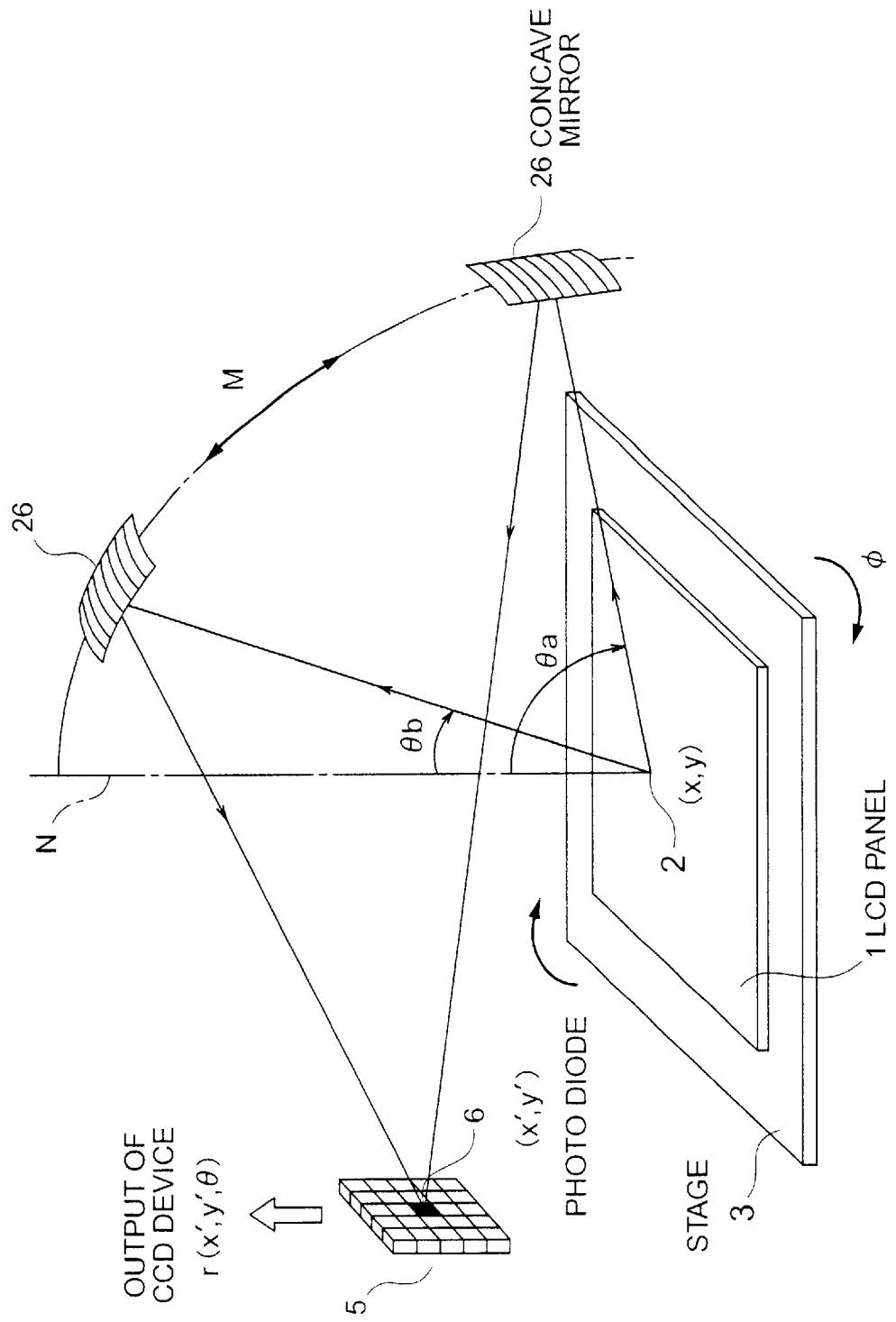
FIG. 12 shows a condensing device having a concave mirror.

FIG. 12 is a bird-eye view of a seventh apparatus for measuring luminance distribution of a radiant area using a concave mirror 26. This is an example which has a concave mirror 26 working as an light receiving/condensing element of the condensing device, instead of the flat mirror 25 of the sixth embodiment. In this example, because the concave mirror 26 condenses light, a condensing lens is unnecessary. The condensing function $|(\theta)$ of this optical system may be given by the reflectivity of the concave mirror 26 inclined at angle $\theta$.

EMBODIMENT 8

Figure 13:
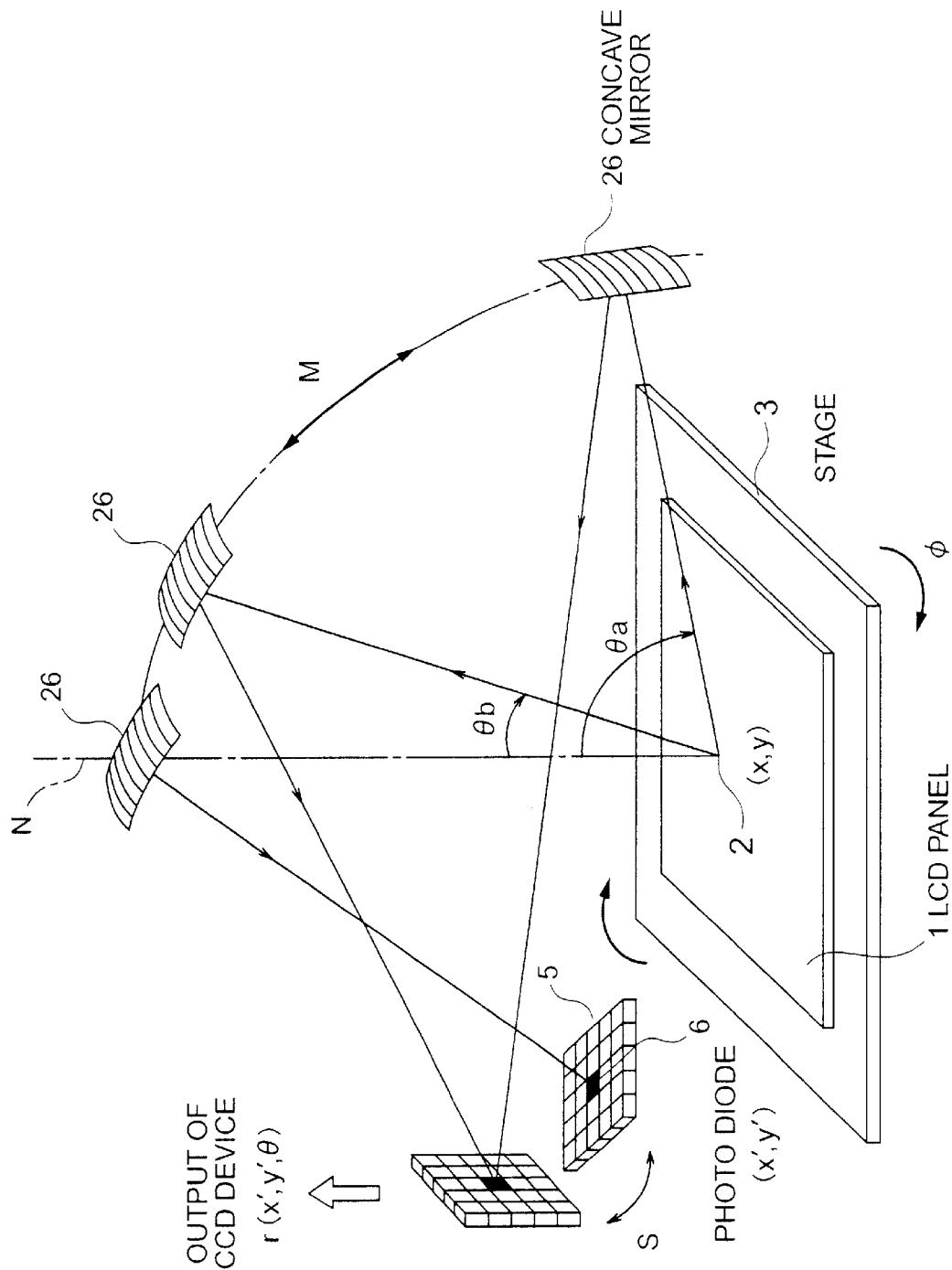
FIG. 13 shows another condensing device having a concave mirror.

FIG. 13 is a bird-eye view of a eighth apparatus for measuring luminance distribution of a radiant body according to the invention. When the concave mirror 26 approaches the uppermost position above the LCD panel 1 through rotation in the direction M, the CCD device 5 is also rotated in the S direction closer to the LCD panel 1. By the rotations of the concave mirror 26 and the CCD device 5, the light reflected by the mirror is advantageously projected onto the intended section of the photodiodes of the CCD device 5 even for small measurement angle θ. This approach can be applied to the fourth embodiment shown in FIG. 9 to bring both the lens and the CCD panel closer to the LCD panel.

Figure 14:
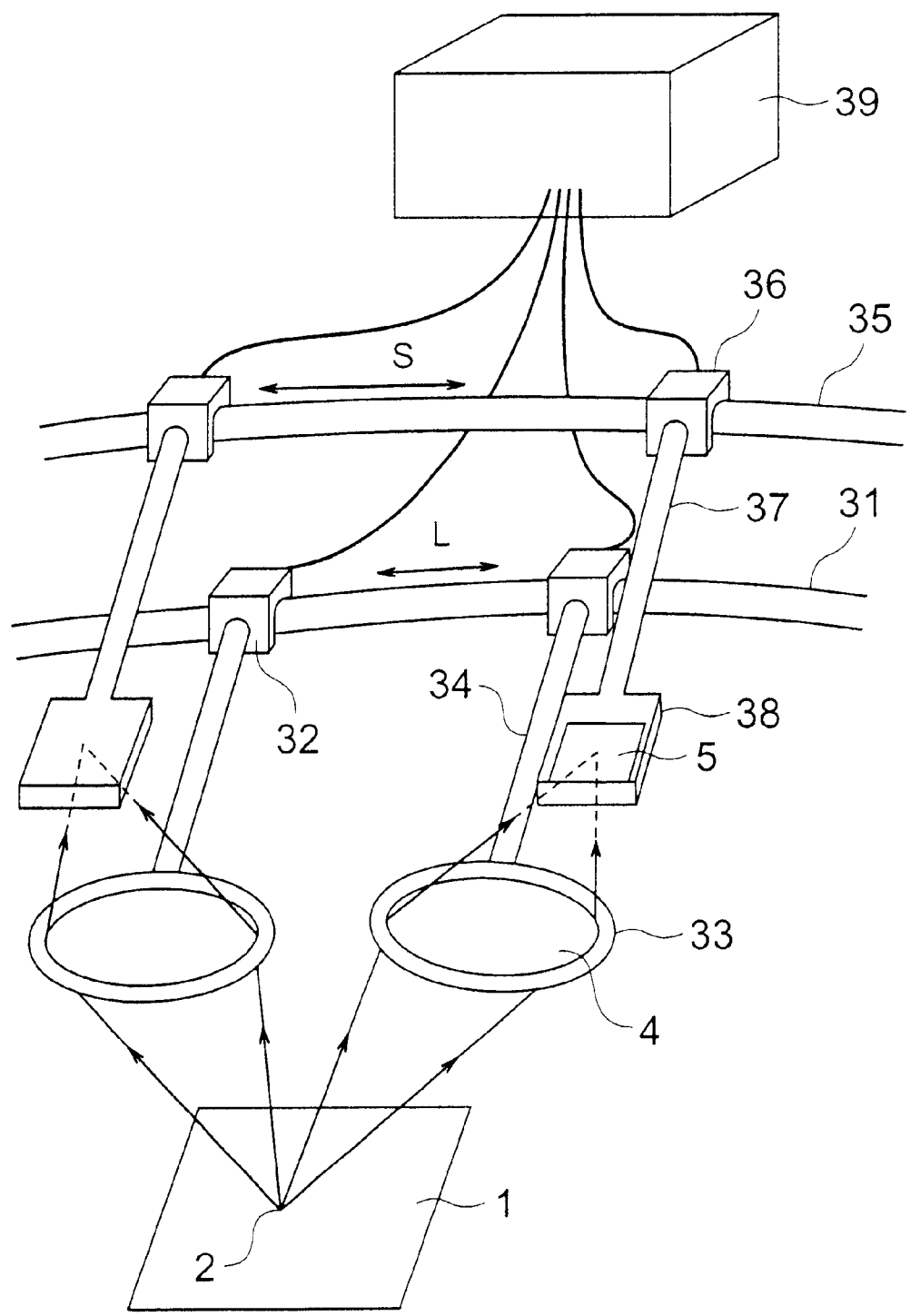
FIG. 14 shows an example of a moving mechanism for use with a condensing device and an imaging device according to the invention.
Figure 15:
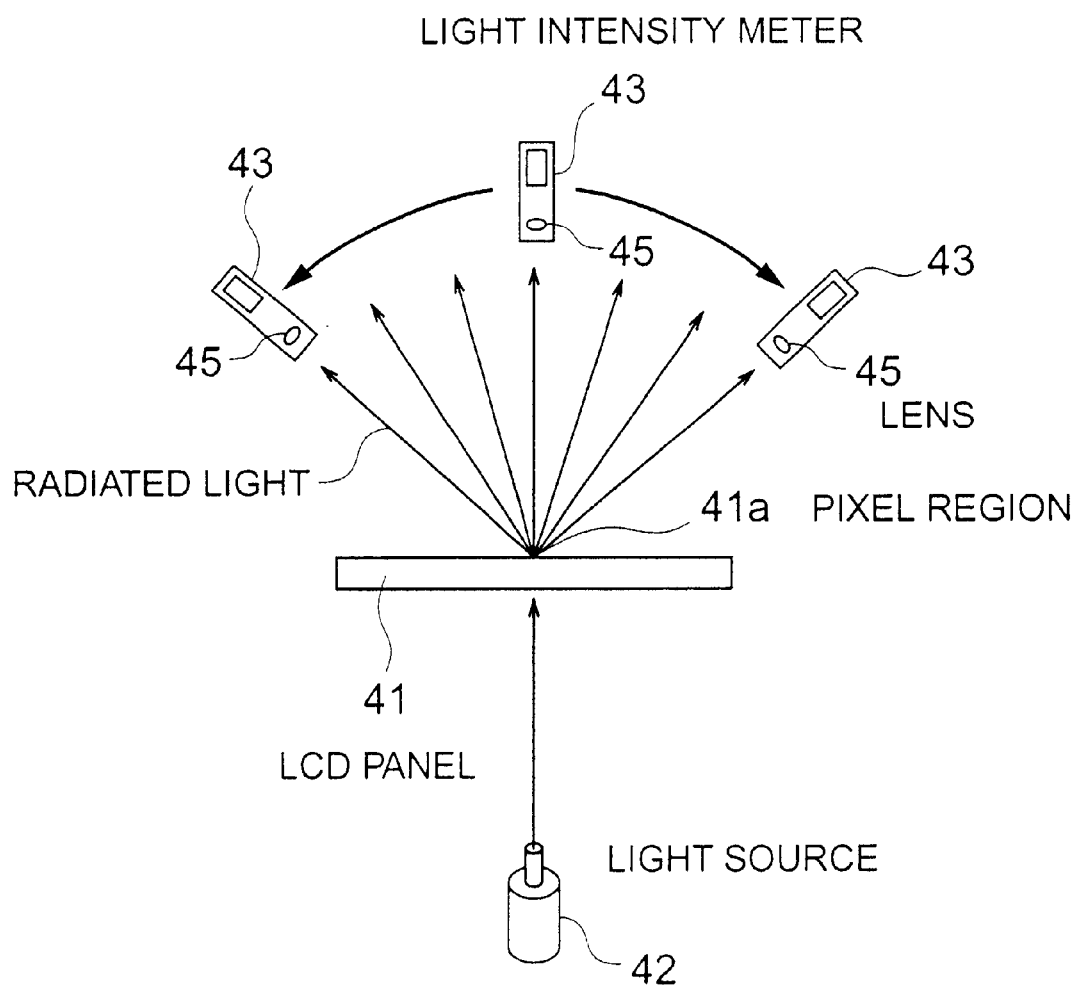
FIG. 15 shows a first conventional apparatus.
Figure 16:
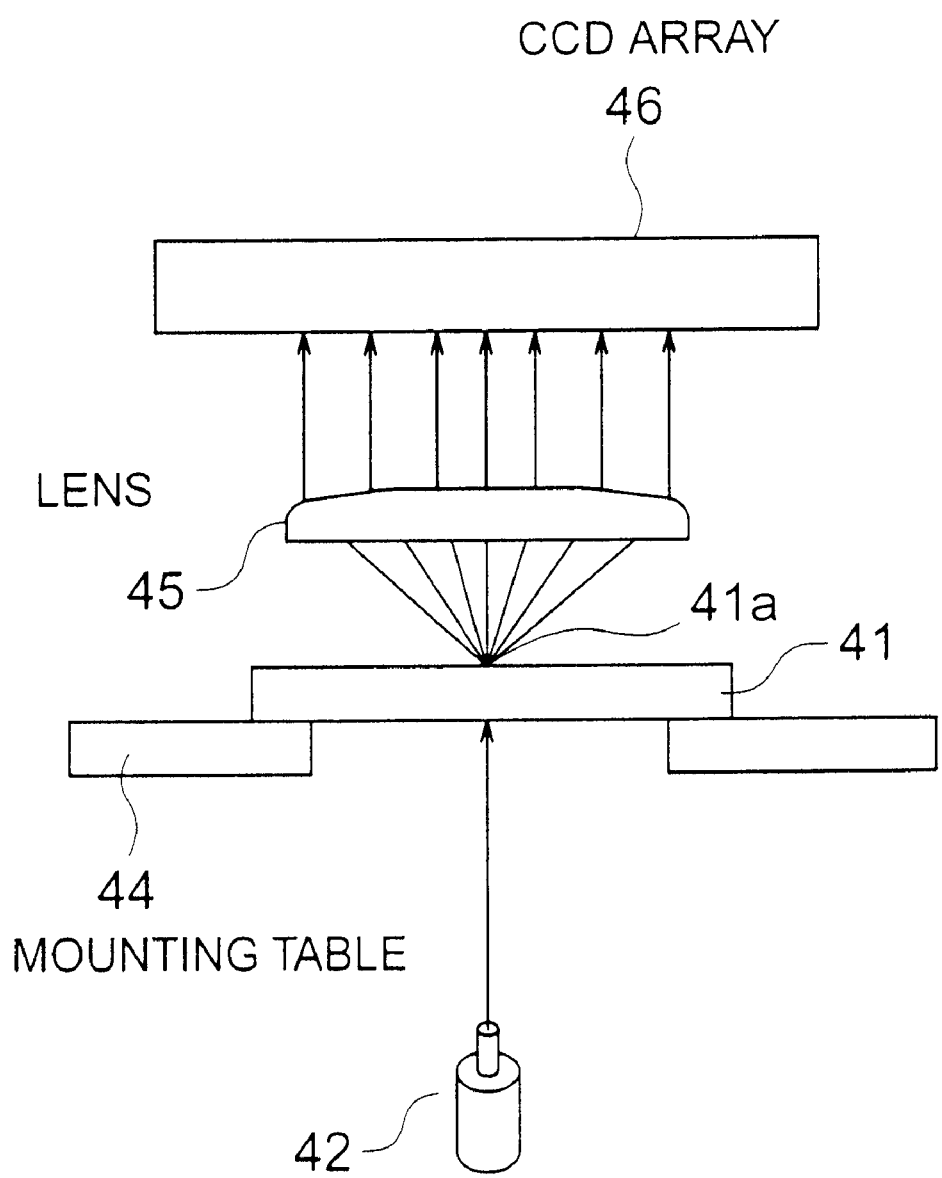
FIG. 16 shows a second conventional apparatus.
Figure 17:
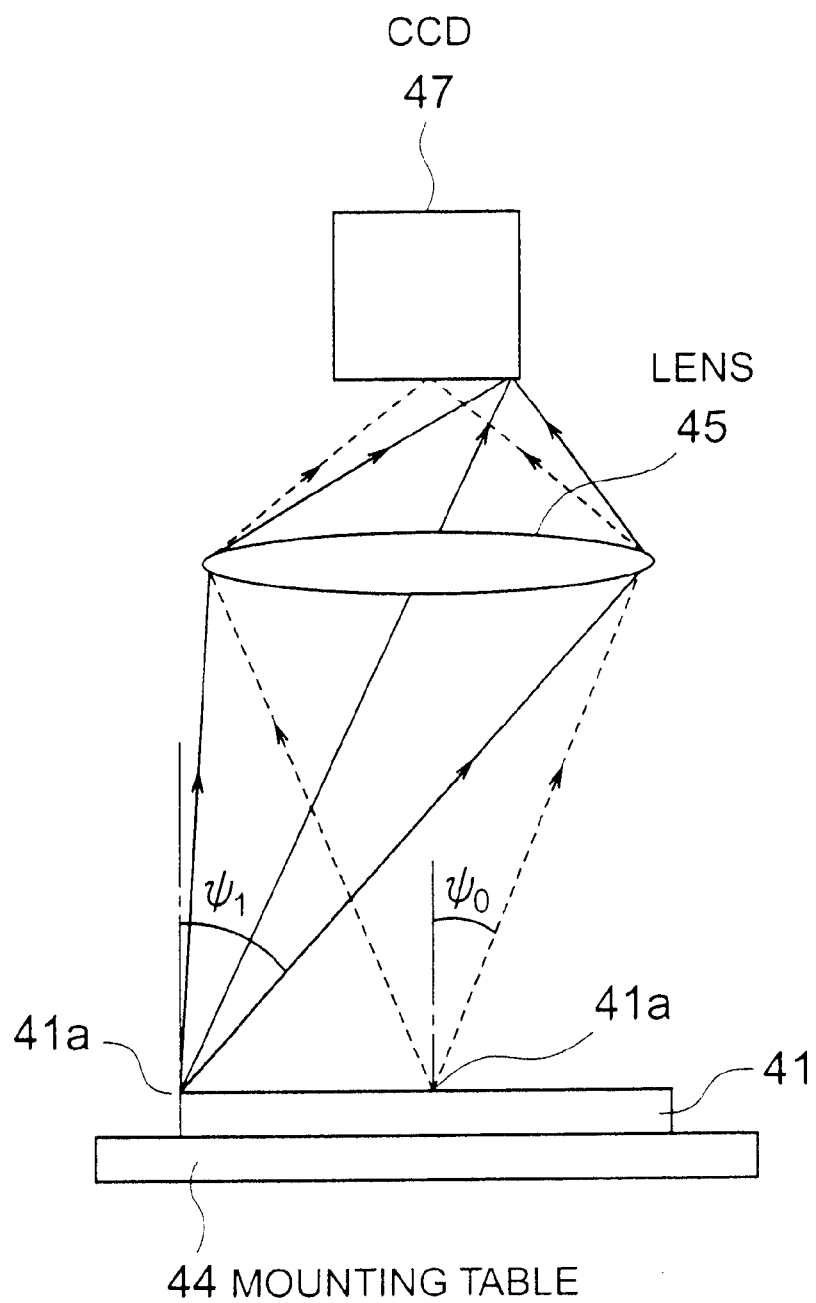
FIG. 17 shows a third conventional apparatus.

Referring to FIG. 14, mechanisms for moving the condensing device and the imaging device will be described below. The mechanism shown in FIG. 14 for moving the condensing device and the imaging device is similar to the one shown in FIG. 1A. This mechanism includes a rail 31 for translating the lens; a guide 32 for guiding the lens 4; a lens holder 33; a lens arm 34; a rail 35 for translating the CCD device; a guide 36 for guiding the CCD device 5; an arm 37 for supporting the CCD device; and a controller 39 for controlling the movements of the lens 4 and the CCD device 5. In the example shown herein, the controller 39 is adapted to receive the output of the CCD device 5 and provide its output to the input controller. The guides 32 and 36 each move on the respective rails 31 and 35 as instructed by the controller 39. At the same time the guides 32 and 36 rotate the respective arms 34 and 37 as instructed by the controller 39.

It will be understood that the mechanism of FIG. 14 can be applied equally well to the examples shown in FIGS. 8 thorough 13, so that the lens of the condensing device and/or the mirror as well as the imaging device is(are) moved to the prescribed position(s) specified by the measurement angle θ.

It should be appreciated that in the inventive method of measuring a luminance distribution, and an apparatus therefor, the incident-angle characteristic (i. e. condensing function) of a condensing lens of the condensing device and/or the incident-angle characteristic of a mirror can be measured beforehand, so that the data obtained in the manners as described above using the condensing device can be corrected for sufficiently accurate and precise luminance and the angular distribution thereof of a radiant object. It should be also appreciated that, if the relative position of the condensing lens or a condensing mirror to the radiant area changes during the measurement, a change in intensity of light due to this positional change can be corrected by an advance calculation thereof, to thereby obtain accurate luminance and the angular distribution thereof of the radiant object.

The invention makes unnecessary a large aperture condensing lens and minimizes the number of imaging elements of the imaging device by providing mechanisms for moving the condensing lens and/or the mirror.

It should be appreciated that the invention allows acquisition of the luminance and the angular distribution thereof of only a localized radiant area (e. g. a pixel) on a given (LCD) display but also the entire display panel. The entirety of such information permits accurate inspection/examination of the display panel for defects and uneven luminance of the panel. In addition, the invention displays the results of such inspection on a display device for easy evaluation of the inspection/examination.

What is claimed is:

1. An apparatus for measuring viewing angle characteristic of luminance and positional characteristic of a radiant object under measurement, by moving a condensing device and an imaging device relative to said object, said condensing device condensing light from a radiant area of said radiant object, and said imaging device forming thereon a real image of said area, said apparatus comprising:

a first mechanism for moving the light receiving elements of said condensing device while keeping constant the solid angle subtended by said light receiving element at said radiant area;

a second mechanism for moving said imaging device in association with said condensing device, while maintaining thereon said image of said radiant area to measure intensity of luminance of said radiant area;

a memory for storing a predetermined condensing function of angle of a beam of light emitted from a laser light source positioned at said radiant area and oriented in the direction at a given angle with respect to the optical axis of said condensing device, said condensing function, the variable of which is said angle of light beam with respect to the optical axis of said condensing device, representing the measured intensity of the image formed on said imaging device by said beam of light;

a circuit for calculating viewing angle dependent and position dependent characteristic of luminance of said radiant area based on the data of said measured intensity of luminance of said radiant area and said condensing function; and a display device for displaying radiance characteristic and distribution characteristic of said object and the result of evaluation of the calculated characteristic of luminance.

2. An apparatus according to claim 1, wherein said condensing device comprises at least one lens or at least one concave mirror.

3. The apparatus according to claim 2, further comprising a circuit for making a correction of said measurement of intensity of luminance of said radiant area when the solid angle subtended by said light receiving element in the form of a lens or mirror as viewed from said radiant area is changed by the movement of said condensing device, wherein said correction is the ratio of the output of the imaging device measuring the luminance at a solid angle, to the output of the imaging device measuring the luminance at a reference solid angle.

4. An apparatus according to claim 1, wherein said condensing device comprises light receiving elements in the form of a flat or concave mirror and a lens for condensing the light reflected by said mirror.

5. The apparatus according to claim 4, further comprising a circuit for making a correction of said measurement of intensity of luminance of said radiant area when the solid angle subtended by said light receiving element in the form of a lens or mirror as viewed from said radiant area is changed by the movement of said condensing device, wherein said correction is the ratio of the output of the imaging device measuring the luminance at a solid angle, to the output of the imaging device measuring the luminance at a reference solid angle.

6. The apparatus according to claim 1, further comprising a circuit for making a correction of said measurement of intensity of luminance of said radiant area when the solid angle subtended by said light receiving element as viewed from said radiant area is changed by the movement of said condensing device, wherein said correction is the ratio of the output of the imaging device measuring the luminance at a solid angle, to the output of the imaging device measuring the luminance at a reference solid angle.

7. A method of measuring viewing angle characteristic of luminance and positional characteristic (2-dimensional characteristic) of a radiant object under measurement, by moving a condensing device and an imaging device relative to an area of said radian object, said condensing device condensing light from a radiant area of said radiant object and said imaging device forming thereon a real image of said area, said method comprising steps of:

- moving the light receiving elements of said condensing device while keeping constant the solid angle subtended by said light receiving element at the radiant area;
- moving said imaging device in association with said condensing device so as to form thereon the real image of said radiant area to measure the luminance thereof, and
- calculating the viewing angle dependent and position dependent characteristic of luminance of said radiant area based on the viewing angle dependent luminance data measured by said imaging device and a condensing function of angle of a radiant beam with respect to the optical axis of said condensing device, said condensing function being determined by measuring the intensity of an image formed on said imaging device, the image is formed by emitting a beam of light from a laser light source, which is positioned at said radiant area and oriented in the direction of an angle with respect to the optical axis of the condensing device, through the condensing device to said imaging device.

8. A method according to claim 7, further comprising a step of making a correction of the measurement of the intensity of the image of the radiant area formed on said imaging device when the solid angle subtended by said light receiving element in the form of a lens or mirror as viewed from said radiant area is changed by the movement of said condensing device, wherein said correction is the ratio of the output of the imaging device measuring the luminance at a solid angle, to the output of the imaging device measuring the luminance at a reference solid angle.

* * * * *